United States Patent [19]
Fournier et al.

[11] Patent Number: 4,750,800
[45] Date of Patent: Jun. 14, 1988

[54] LOW STRESS MOUNTING OF INTEGRATED OPTIC CHIPS

[75] Inventors: Joseph T. Fournier, Glastonbury; Richard E. Swarts, Simsbury; Mario T. Lopiccolo, Southington, all of Conn.

[73] Assignee: United Technologies Corporation, Hartford, Conn.

[21] Appl. No.: 926,943

[22] Filed: Nov. 4, 1986

[51] Int. Cl.⁴ .......................... G02B 6/12; G02B 6/10; H01L 23/02; H01J 5/00
[52] U.S. Cl. .................................................. 350/96.11
[58] Field of Search ................ 350/96.11, 96.12, 96.13, 350/96.14; 357/74; 174/50.16

[56] References Cited

U.S. PATENT DOCUMENTS 3,874,782  4/1975  Schmidt ........................... 350/96.14
4,400,052  8/1983  Alferness ..................... 350/96.11 X
4,649,624  3/1987  Reedy ..................................... 29/571

Primary Examiner—William L. Sikes
Assistant Examiner—Akm E. Ullah
Attorney, Agent, or Firm—Dominic J. Chiantera

[57] ABSTRACT

An integrated optic IO device chip with anisotropic thermal expansion properties is packaged in a material enclosure by first bonding the chip to a substrate having anisotropic thermal expansion properties substantially equivalent to those of the IO device and substrate thickness substantially greater than that of the IO device, and bonding the substrate to the enclosure.

13 Claims, 1 Drawing Sheet

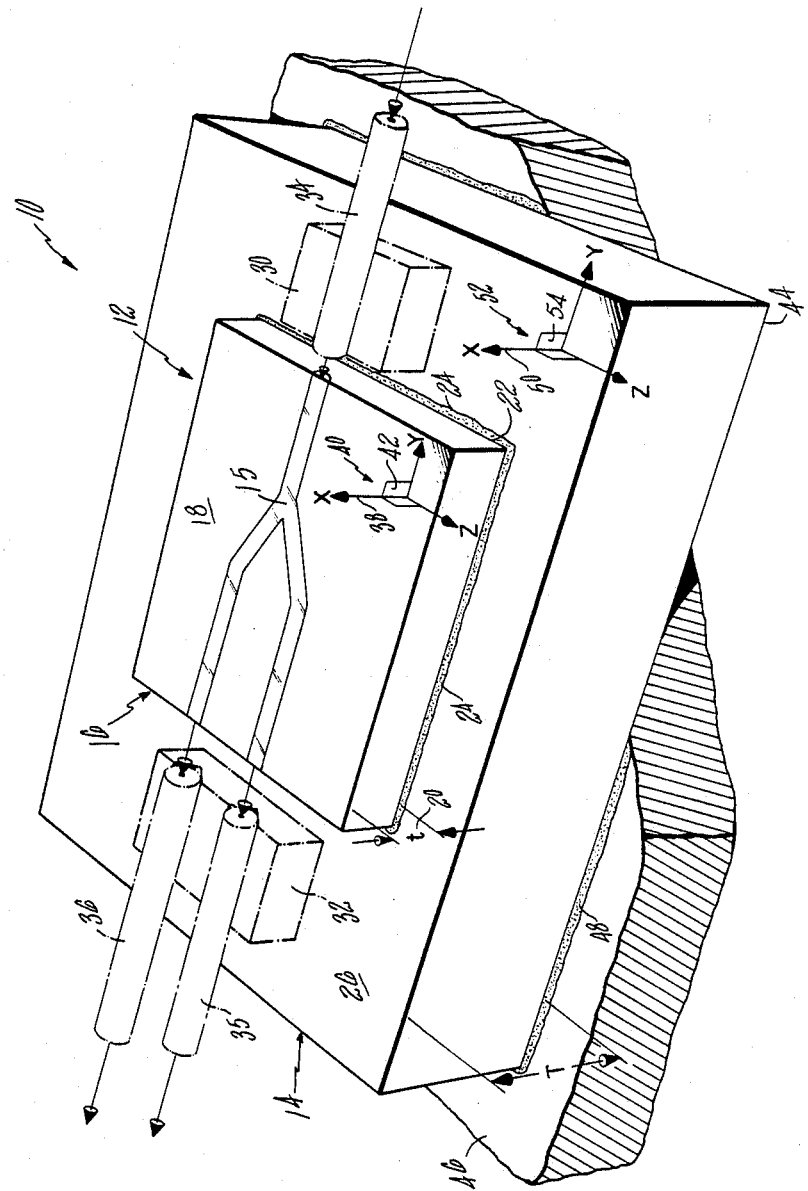

LOW STRESS MOUNTING OF INTEGRATED OPTIC CHIPS

TECHNICAL FIELD

This invention relates to mounting structures for integrated optic devices.

BACKGROUND OF INVENTION

The term "integrated optics" refers in general to a class of devices for guiding and controlling light in thin film layers or in narrow waveguiding channels formed in suitable dielectric materials (crystal or glass). The present use of integrated optic devices is confined primarily to laboratory systems and development prototypes. However, numerous applications in communications and in optical sensing are anticipated. Representative IO devices include optical waveguides, switches, polarizers, phase modulators, and other functional devices. In system applications several functional units may be combined ("integrated") on a single crystalline or glass substrate (an "optical chip"), and the devices may be connected to sources, detectors or other optical devices by means of optical fiber.

While several materials have been used as substrates for IO device fabrication, one of the most widely used IO device materials is lithium niobate. It is used primarily because of its favorable optical and electro-optical properties, and it is anticipated that IO devices of lithium niobate will find wide application. However, to make the transition from the laboratory to usage in practical applications, a number of packaging problems will require solution.

One such problem arises because lithium niobate exhibits strongly anisotropic thermal expansion properties: that is to say the dimensional changes in the material associated with a temperature change differ in different directions in the crystal. In practical application, devices may be required to survive wide temperature fluctuation, e.g. from $-55°$ C. to $+150°$ C. is a common military specification. A mismatch in thermal expansion between the IO chip and the substrate on which it is mounted can result in substantial stresses being transmitted to the IO device. In severe cases, these stresses can lead to failure of the bond between the IO device and the mounting or to breakage of the brittle crystalline chip.

Lithium niobate also exhibits a photoelastic effect whereby an applied stress results in a change in the optical refractive index. Many of the desired functions of integrated optic devices depend on controlled changes in the refractive index. For example, controlled phase modulation in lithium niobate can be achieved by application of an electric field (the electro-optic effect). Stresses due to thermal expansion mismatch resulting from uncontrolled temperature excursions can, via the photoelastic effect, lead to spurious refractive index changes which can interfere with the controlled changes being impressed in the desired operation of the device. For these and other reasons it is desirable to provide a mounting for the IO device whereby stress transmission is minimized. As will be shown below, provision for such low stress mounting is further complicated by the anisotropic thermal expansion previously mentioned.

Lithium niobate has a crystal structure which exhibits a three-fold rotational symmetry about an axis in a particular direction in the crystal. By convention a Cartesian coordnate system of three mutually orthogonal axes designated X, Y and Z is used to describe the crystal's physical tensor properties with the Z axis directed along the crystal's three-fold rotation axes.

It is sufficient to note that thermal expansion coefficients range from $2 \times 10^{-6}/°C$. to $7.5 \times 10^{-6}/°C$., while the thermal expansion in the X-Y plane is isotropic and in the range of $14$–$17 \times 10^{-6}/°C$. An 8-1 difference. Another useful material for IO devices is lithium tantalate ($LiTaO_3$). This material has a thermal expansion coefficient of about $4 \times 10^{-6}/°C$. in the Z direction and $16 \times 10^{-6}/°C$. in the X and Y directions).

If an IO device is fabricated in a thin rectangular slab of $LiNbO_3$ such that X and Z or Y and Z axes are in the plane of the slab, then the thermal expansion coefficient differs strongly along the two principal axes in the plane of the slab. While a conventional metal substrate may match one coefficient (e.g., certain brass or stainless steel compositions match the high thermal expansion coefficient of $LiNbO_3$) a severe mismatch would exist between the metal substrate and the lithium niobate in the direction of the low thermal expansion coefficient axis. The problem does not exist in chips cut such that the X and Y axes lie in the principal plane. However, the electro-optic effect is anisotropic also, and for optimum optical function it is frequently desirable to have anisotropic thermal expansion in the plane of the slab. However, optical properties of $LiNbO_3$ such as the electro-optic effect are anisotropic also, and for reason of optimum optical function it is frequently desirable to utilize a crystal cut such that anisotropic thermal expansion exists in the plane of the slab.

Typically thin slabs are cut from large crystal boules such that one of the principal axis is normal to the broad face of the slab, and the slabs are designated X-, Y-, or Z-cut accordingly as the X, Y or Z axis is orthogonal to the broad face. Furthermore, rectangular slabs are frequently cut such that principal axes lie along the edges of the slab. In such case the slab may be further specified by noting the axis along the long direction. Thus and XY-cut describes a crystal with X axis normal to the broad face and Y axis in the long direction of the slab.

DISCLOSURE OF INVENTION

The object of the present invention is to provide for low stress mounting of integrated optic (IO) devices to a device enclosure surface.

According to the present invention, an IO device comprising an optical signal path disposed in a principal plane of a crystalline chip having known chip thickness, anisotropic thermal characteristics, and crystallographic orientation, is mounted to a first surface of a similar thermally anisotropic crystalline material substrate, with similar crystallographic orientation, to provide mutual orientation of the crystallographic axes of the chip and substrate, and a second surface of the substrate, spaced at a substrate thickness from the first surface, is bonded to the enclosure surface with a resilient adhesive.

In still further accord with the present invention, the substrate thickness is a minimum of ten times greater than the chip thickness.

These and other objects, features, and advantages of the present invention will become more apparent in light of the following detailed description of a best mode embodiment thereof, as illustrated in the accompanying Drawing.

BRIEF DESCRIPTION OF THE DRAWING

FIG. 1, the single FIGURE in this application, is a perspective illustration of an IO device mounting structure according to the present invention.

BEST MODE FOR CARRYING OUT THE INVENTION

FIG. 1, which is not drawn to dimensional scale, illustrates the present IO device low stress mounting structure 10. An IO device 12 is bonded to a substrate 14. For illustrative purposes the IO device consists of a simple "Y" shaped optical waveguide 15, disposed in $LiNbO_3$ by means known in the art, e.g. ion exchange or titanium diffusion. The $LiNbO_3$ is in the form of a rectangular chip (i.e. slab) 16 with a crystal surface 18 spaced at a crystal thickness (t) 20 from a crystal mating surface 22 (not shown); both surfaces lying in the principal plane of the chip. The mating surface is bonded along a seam 24 to a mounting surface 26 of the substrate.

The I/O device is positioned on the substrate mounting surface, together with fiber carriers 30, 32 which support the input and output optical fibers 34 and 35, 36 (all shown in phantom for clarity of illustration). The optical fibers may be single mode fibers with a core diameter on the order of 4–12 microns and a cladding diameter of approximately 70–130 microns.

The $LiNbO_3$ slab thickness (t) is approximately 1.0 millimeter, with length and width selected for the particular application. The slab is an X-cut crystal which, by convention, means that the X axis 38 of the chip Cartesian coordinate system 40 is normal 42 to the crystal cut surface 18. Also by convention, the longest dimension of the chip is identified by the Cartesian coordinate axis parallel to it. In FIG. 1 it is assumed that the chip's longest dimension lies parallel to the waveguide path, and the chip is designated an "XY-cut".

The $LiNbO_3$ slab is adhesive bonded using a ultraviolet cured adhesive to the substrate mounting surface 26 (bond seam 24). The mounting surface is spaced at a substrate thickness (T) from a substrate mating surface 44 (substrate bottom surface). The substrate mating surface is attached to the support package structure 46 (only partially shown in breakaway section) with a compliant adhesive bonding 48, such as silicon rubber, so as to limit (by absorption) stress transmission from the support package structure to the substrate. The package material may be a metal, such as brass, or stainless steel, or a suitable ceramic.

The point of novelty in the present invention lies in the selection of the substrate material and in the mounting orientation of the IO device to the substrate. The substrate material is chosen from materials having anisotropic thermal expansion characteristics similar to those of the IO device. Preferably the substrate will exhibit anisotropic characteristics which would match exactly those of the chip, and in a best mode embodiment the substrate material would be identical to that of the IO device (e.g. $LiNbO_3$ crystal with the same crystal cut as the IO chip). In the embodiment of FIG. 1, therefore, the substrate is XY-cut $LiNbO_3$ as designated by the X axis 50 of the substrate Cartesian coordinate system 52 being normal 54 to the substrate surface 26 (i.e. substrate mounting surface). The $LiNbO_3$ chip 16 is bonded to the $LiNbO_3$ substrate with the crystallographic axes of each being mutually parallel (i.e. with mutual crystallographic orientation).

With the chip and substrate being mounted in mutual crystallographic orientation, thermal expansion differences between the two is eliminated, thereby reducing strain in the chip. To reduce thermally induced stress transmitted through the substrate from the package (46)-to-substrate (14) interface, the substrate thickness (T) is made large relative to the chip thickness (t). The exact relative thicknesses depend on the particular IO device environment and package material, however, a desirable minimum substrate-to-chip thickness ratio is 10-to-1. For a t=1.0 millimeter thick chip the minimum substrate thickness T=10.0 millimeters.

While a $LiNbO_3$ material substrate represents the best mounting structure for reduced thermal strain of a $LiNbO_3$ chip, alternative, less costly, anisotropic materials may be used. One such preferred alternative substrate material comprises composites of aluminum-graphite fiber formulated to have anisotropic thermal expansion characteristics which match $LiNbO_3$ crystal. By proper choice of fiber orientation and density, the anisotropic $LiNbO_3$ can be matched exactly. These aluminum-graphite composites are commercially available, and have the advantage of lower cost, ease of machining, and unlimited size availability over the lithium niobate.

Although the invention has been shown and described with respect to a best mode embodiment thereof, it should be understood by those skilled in the art that various other changes, additions, and omissions may be made therein without departing from the spirit and the scope of the invention. In particular while the best mode has been illustrated with specific reference to $LiNbO_3$, it should be understood that the method disclosed applies equally to other optical waveguide materials exhibiting anisotropic mechanical properties.

We claim:

1. Apparatus for enclosing an integrated optical IO device having an optical signal path fabricated in a crystalline chip of a thickness and crystallographic orientation selected to provide anisotropic thermal expansion in the principal plane of the optical signal path, comprising:

a substrate comprising crystalline material having a similar crystallographic axes orientation and similar anisotropic coefficients of thermal expansion to those of the chip, and having substrate first and second mounting surfaces spaced apart at a substrate thickness, said substrate first mounting surface being adapted to receive the IO chip in bonded relationship thereto with mutual crystallographic orientation of the chip principal plane with said substrate first mounting surface; and package enclosure means having an enclosure mounting surface bonded to said substrate second mounting surface with a resilient adhesive.

2. The apparatus of claim 1, wherein said substrate thickness is at least ten times greater than said chip selected thickness.

3. The apparatus of claim 1, wherein said resilient adhesive is silicon rubber.

4. The apparatus of claim 1, wherein said substrate material is $LiNbO_3$ cut crystal.

5. The apparatus of claim 1, wherein said substrate material is an anisotropic, graphite-aluminum composite material.

6. The method of mounting, to an enclosure surface, an integrated optical (IO) device of the type having an optical signal path disposed on a crystalline chip having anisotropic thermal characteristics, comprising the steps of:

determining the coefficients of thermal expansion of the chip and the orientation of the chip crystallographic axes in the principal plane of the optical signal path;

providing a crystalline material substrate having a similar crystallographic axes orientation and similar anisotropic coefficients of thermal expansion to those of the chip, and having substrate first and second mounting surfaces spaced apart at a substrate thickness;

fastening the chip to said substrate to provide mutual crystallographic orientation of the principal plane with said substrate first mounting surface; and bonding said substrate second mounting surface to the enclosure surface with a resilient adhesive.

7. The method of claim 6, wherein
said step of determining further includes the step of measuring the chip thickness, and
said step of providing further includes selecting a substrate having a substrate thickness at least ten times greater than said chip thickness.

8. The method of claim 6, wherein
said step of fastening includes the step of bonding the chip to said substrate first mounting surface with an epoxy bond.

9. The method of claim 6, wherein said resilient adhesive is silicon rubber.

10. The method of claim 6, wherein said integrated optic device is fabricated in $LiNbO_3$ crystal and said substrate material is $LiNbO_3$ crystal.

11. The method of claim 6, wherein said integrated optic device is fabricated in $LiTaO_3$ crystal and said substrate material is $LiNbO_3$ crystal.

12. The method of claim 10, wherein said substrate material is a graphite fiber-aluminum composite material with anisotropic thermal expansion coefficients substantially equal to those of $LiNbO_3$.

13. The method of claim 11, wherein said substrate material is a graphite fiber-aluminum composite material with anisotropic expansion coefficients substantially equal to those of $LiTaO_3$.

* * * * *

UNITED STATES PATENT AND TRADEMARK OFFICE
CERTIFICATE OF CORRECTION

PATENT NO. : 4,750,800

DATED : June 14, 1988

INVENTOR(S) : Joseph T. Fournier, Richard E. Swarts and Mario T. Lopiccolo

It is certified that error appears in the above-identified patent and that said Letters Patent is hereby corrected as shown below:

Column 2, lines 29-33, cancel "However, optic properties ... in the plane of the slab."

Column 3, line 62, delete "IO".

Column 3, line 63, delete "IO".

Claim 13, line 22, insert --thermal-- after "anisotropic".

Signed and Sealed this

Tenth Day of July, 1990

Attest:

HARRY F. MANBECK, JR.

*Attesting Officer*      *Commissioner of Patents and Trademarks*